United States Patent [19]

Mann

[11] Patent Number: 5,641,107
[45] Date of Patent: Jun. 24, 1997

[54] FOOT MEMBER IN ROOF-MOUNTED LOAD-CARRIERS FOR VEHICLES

[75] Inventor: Gerhard Mann, Ulricehamn, Sweden

[73] Assignee: Mont Blanc Industri AB, Toarpsdal, Sweden

[21] Appl. No.: 448,545

[22] PCT Filed: Aug. 25, 1994

[86] PCT No.: PCT/SE94/00774

§ 371 Date: Dec. 6, 1995

§ 102(e) Date: Dec. 6, 1995

[87] PCT Pub. No.: WO95/11145

PCT Pub. Date: Apr. 27, 1995

[30] Foreign Application Priority Data

Oct. 20, 1993 [SE] Sweden ................... 9303442

[51] Int. Cl.⁶ ........................................................ B60R 9/04
[52] U.S. Cl. .............................................. 224/331; 224/309
[58] Field of Search ................................. 224/309, 315, 224/322, 329, 330, 331, 321

[56] References Cited

U.S. PATENT DOCUMENTS

| | | | |
|---|---|---|---|
| 3,064,868 | 11/1962 | Treydte | 224/331 |
| 4,496,089 | 1/1985 | Eklund | 224/329 |
| 5,104,020 | 4/1992 | Arvidsson et al. | 224/321 |
| 5,366,128 | 11/1994 | Grim | 224/330 |

FOREIGN PATENT DOCUMENTS

| | | | |
|---|---|---|---|
| 2740522 | 3/1979 | Germany | 224/321 |
| 3421543 | 12/1985 | Germany | 224/321 |
| 3832867 | 4/1990 | Germany | 224/331 |
| 3709335 | 4/1992 | Germany . | |
| 100778 | 8/1962 | Norway | 224/331 |
| 94/00315 | 1/1994 | WIPO | 224/329 |
| 94/21491 | 9/1994 | WIPO | 224/330 |

*Primary Examiner*—Henry J. Recla
*Assistant Examiner*—Gregory M. Vidovich
*Attorney, Agent, or Firm*—Dvorak and Traub

[57] ABSTRACT

The invention concerns a foot member in roof-mounted load-carriers for vehicles, of the kind comprising a pair of support members, with each such member placed on the upper face of the vehicle roof adjacent the respective one of the two longitudinal sides of the vehicle, a carrier rail extending transversely across the vehicle roof and interconnecting said support member, and a grip member in cooperating roof edge portion and arranged to be actuated by a lever mechanism to releasably secure the load-carrier by clamping it against the corresponding roof-edge portion as a result of mutual vertical displacement of the individual grip member relatively to is associated support member upon pivotal movement of said lever. In accordance with the invention the support member and the lever comprise one curved cam part each, said cam parts arranged, upon pivotal movement of said lever, to perform a scissor-blade motion of displacement, a slidable body, which is connected to the grip member, extending through the free area between the two cooperating cam curves (15", 16'), i.e. externally of the "scissor-blade nip" calculated in the direction from the pivot between said lever and the support member, the position of displacement of said slidable body being determined by the portion of the "scissor-blade nip", i.e. by the position of pivotment of said lever relatively to the support member.

8 Claims, 5 Drawing Sheets

FOOT MEMBER IN ROOF-MOUNTED LOAD-CARRIERS FOR VEHICLES

BACKGROUND OF THE INVENTION

The subject invention concerns a foot member in roof-mounted load-carriers for vehicles, of the kind comprising a pair of support members, each member being placed on the upper face of the vehicle roof adjacent the respective one of the two longitudinal sides of the vehicle, a carrier rail extending transversely across the vehicle roof and interconnecting said support members, and a grip member in cooperating engagement with the adjacent roof edge portion and arranged to be actuated by a lever mechanism to releasably secure the load-carrier by clamping it against the corresponding roof-edge portion as a result of mutual vertical displacement of the individual grip member relatively to its associated support member upon pivotal movement of said lever.

SUMMARY OF THE INVENTION

The main purpose of the invention is to provide a simple and reliable actuating mechanism which is designed to clamp the support member against the roof edge portion and which comprises a reduced number of movable components in said mechanism.

This purpose is achieved by means of foot member in accordance with the invention which is essentially chatacterized in that the support member and the lever comprise one curved cam part each, said cam parts arranged, upon pivotal movement of said lever, to perform a scissor-blade motion of displacement, a slidable body, which is connected to the grip member, extending through the free area between the two cooperating cam curves, i.e. externally of the "scissor-blade nip"0 calculated in the direction from the pivot between said lever and the support member, the position of displacement of said slidable body being determined by the portion of the "scissor-blade nip", i.e. by the position of pivotment of said lever relatively to the support member.

Preferably, the lever serves as a handle and is designed as a single-arm lever, the cam curves being positioned on the same side of the pivot as the handle and being directed so as to ensure that the "scissor-blade bite"0 is displaced away from the pivot point when the handle/lever is pivoted towards the foot member.

Preferably, the support member and the lever also are formed with one each of spaced apart, mutually parallel cam curves. In this manner, the slidable body will be positively and firmly guided, also when exposed to high pulling forces.

In addition, the spacing between cam curves associated with the same component and having a comparatively stable orientation relatively to said component is bridged by a yoke member supporting the associated sliding body and, from which yoke the grip portion is suspended at its top.

In addition, the means of suspension of the grip member from the yoke is in the form of a bolt extending through the yoke and by means of which the vertical position of said grip member relatively to the support member, and thus the degree of tightening between said grip member and said support member, may be adjusted by screwing or unscrewing the bolt.

This arrangement provides stable orientation of the slidable body and permits the grip member clamping position to be adjusted in a simple manner.

Preferably, the curved cam parts comprise, at least at one end of their operative part, a shoulder having an edge for support of said slidable body extending transversely relatively to the transverse direction of the pulling force acting on the slidable body. Owing to this shoulder a stable end position is obtained, preventing the foot member from being unintentionally loosened from the associated roof edge portion.

Furthermore, the central portion of the yoke is formed with supporting faces turned towards the cam part side faces. This provides an efficient lateral orientation of the slidable body.

Preferably, the curvature of the cam curves is designed to ensure that the gear ratio between the lever and the grip member is higher during the last part of the clamping movement than during the rest of that movement. In this manner it becomes possible to rapidly bring the clamping member to its clamping position by pivoting the lever and consequently to obtain a strong clamping force during the latter portion of the lever pivotal movement.

Preferably, each curved cam part on the foot member is formed with a recess, into which penetrates a pin-shaped part of the yoke. In this manner the slidable body will be guided, also when the lever is pivoted outwards, which means that the yoke member with its associated slidable body may be given a displacement motion closely following the cam curve of the foot member.

BRIEF DESCRIPTION OF THE DRAWINGS

The invention will be described in closer detail in the following with reference to one embodiment illustrated in the annexed drawing figures, in which.

DETAILED DESCRIPTION OF THE PREFERRED EMBODIMENT

Figure 1:
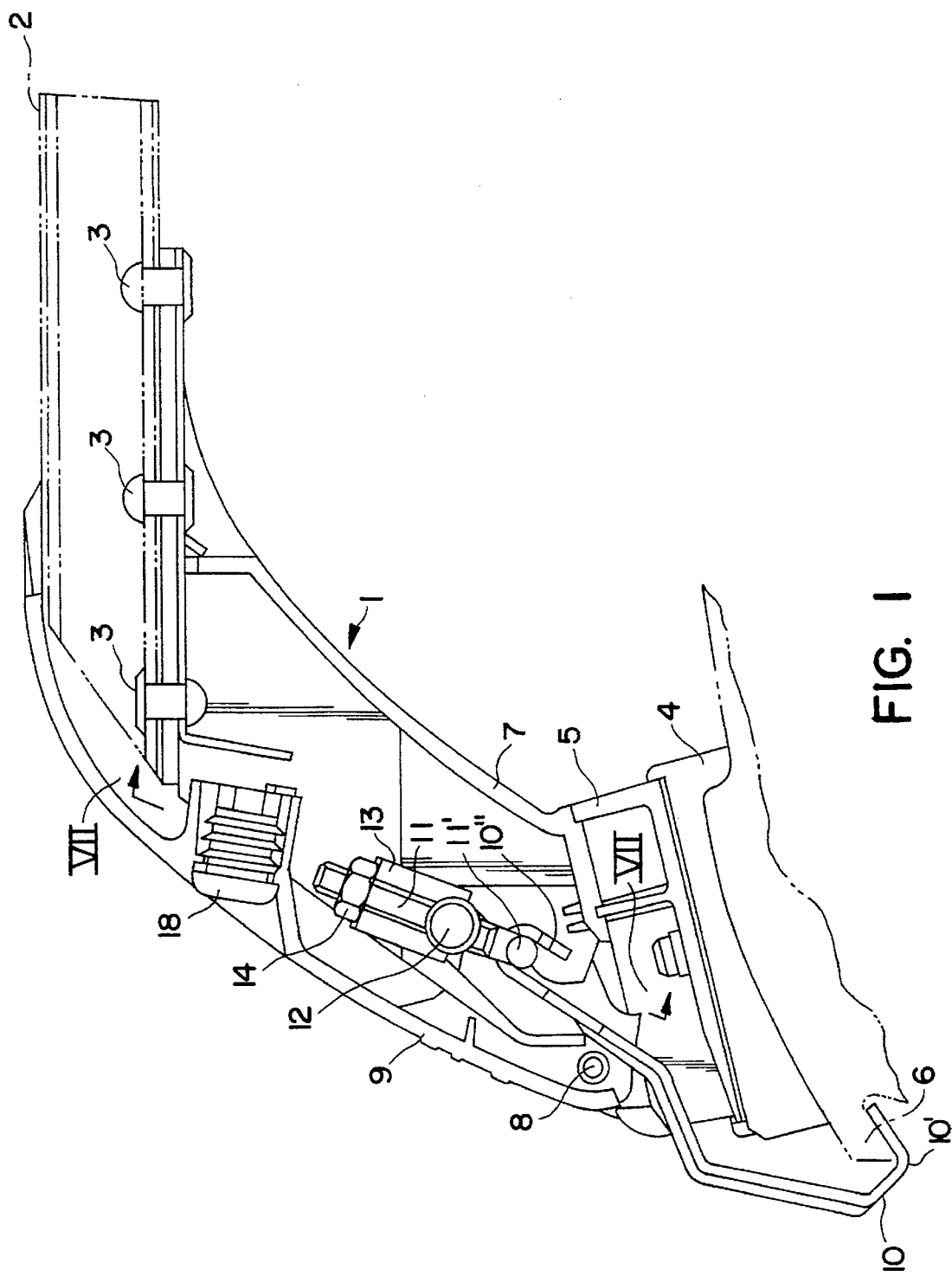
FIG. 1 illustrates a foot member in accordance with the invention when clamped to the roof edge portion of a vehicle.

In FIG. 1 numeral reference 1 designates the foot member generally and numeral reference 2 designates a carrier rail 2 supported by the foot members. The carrier rail 2 preferably is connected with a foot member by means of a suitable Joint, which in accordance with the embodiment shows is formed by rivets 3. The carrier rail 2 extends across the vehicle roof up to a corresponding foot member, not shown, situated at the opposite longitudinal vehicle side. At its bottom, the foot member 1 preferably carries a support pad 4 by way of an adjustment piece 5 for adaptation to the roof inclination. Preferably, the support pad 4 is made from a comparatively soft material which preferably is moulded in conformity with the part of the vehicle roof edge portion 6 against which it is intended to abut. Suitable materials for the support pad are rubber or plastics. The adjustment piece 5 preferably is made from a more rigid and preferably moulded material. The main portions of the foot member 1 are a support member 7, a lever 9 which is pivotally mounted on a pivot pin 8 for pivotal movement about the support member, and a grip member 10 which is actuated by the pivotal movement of the lever 9.

Figure 2:
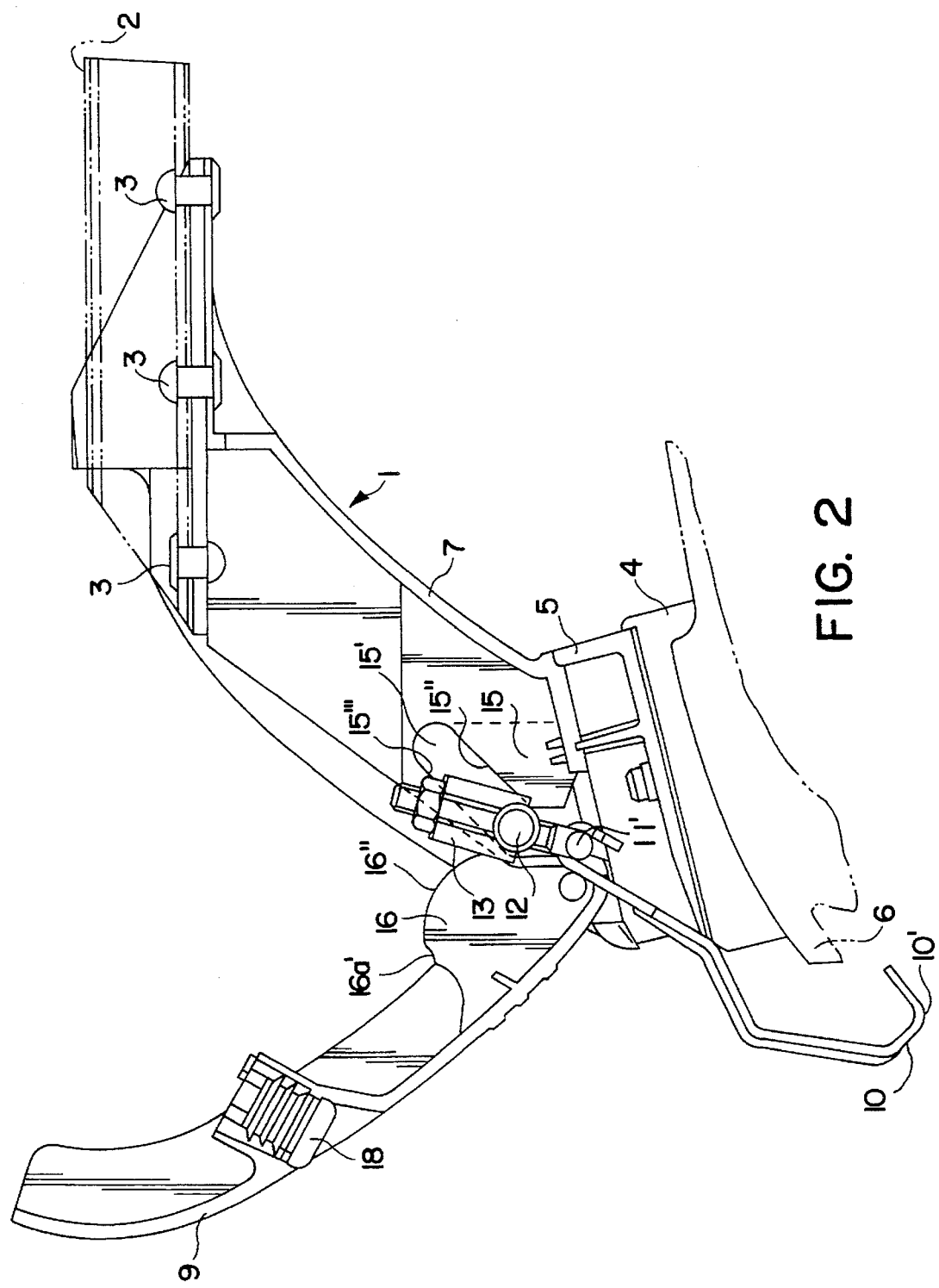
FIG. 2 illustrates the same foot member in an untightened position, i.e. in a position, in which the corresponding load carrier may be freely lifted off the vehicle roof.
Figure 4:
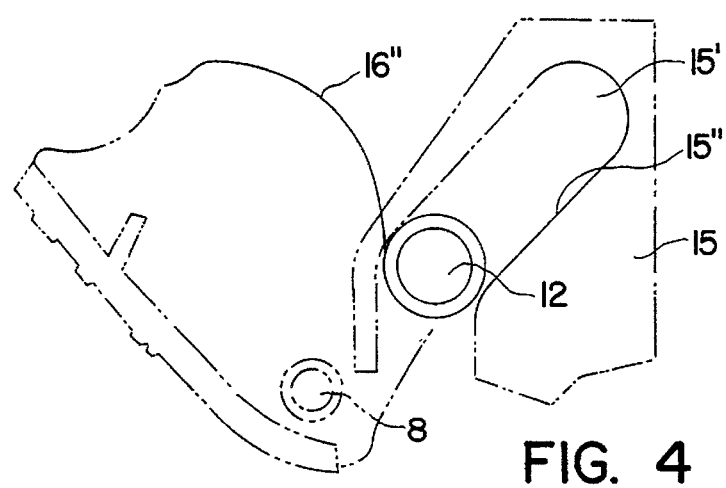
Figure 5:
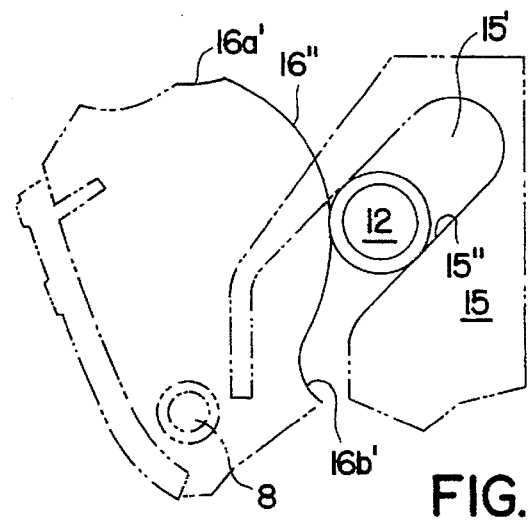
Figure 6:
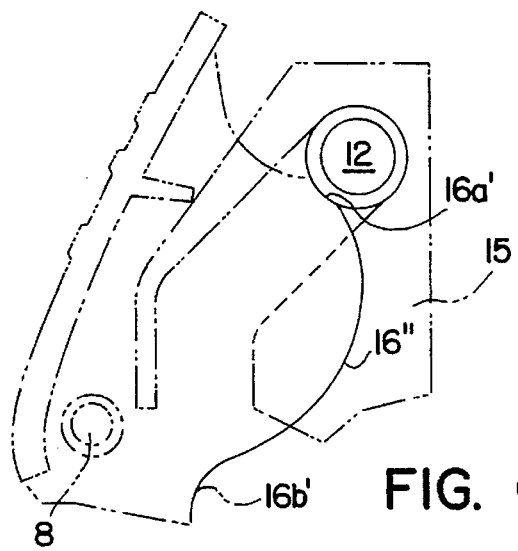
Figure 7:
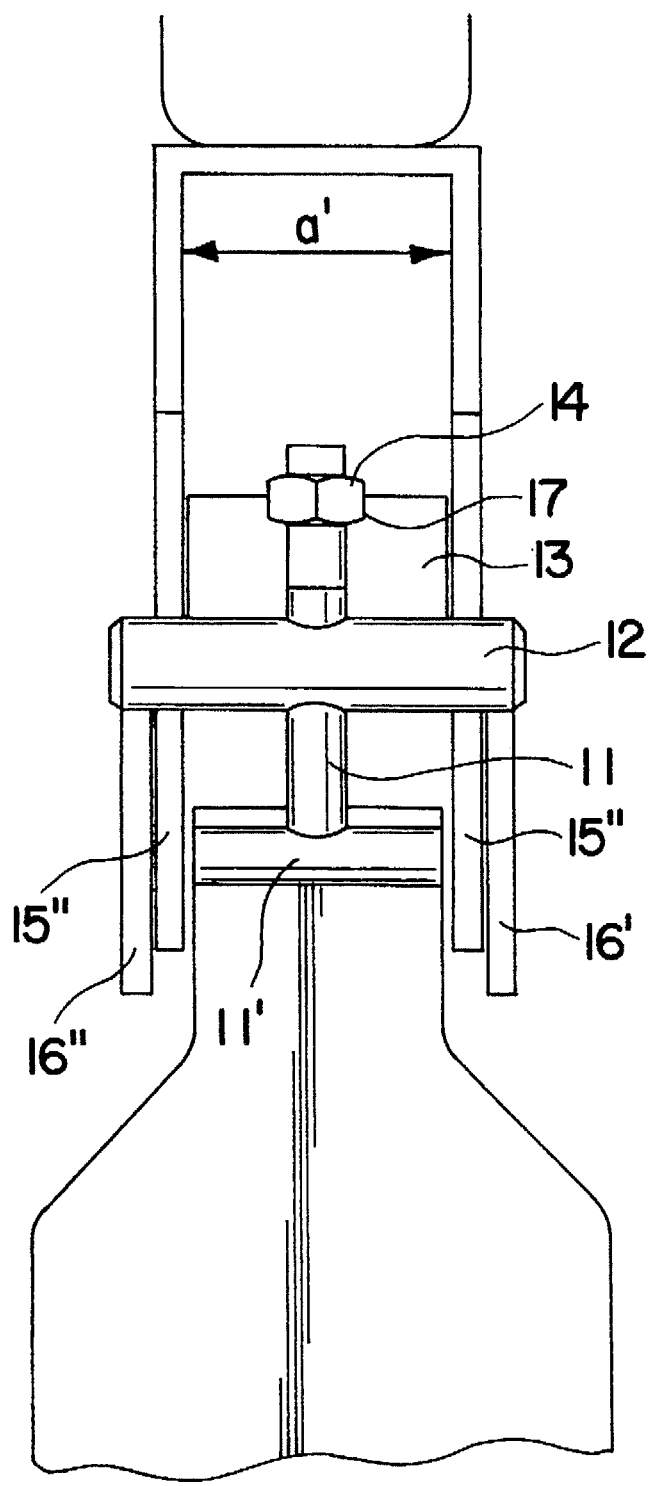
FIG. 7 is a sectional view essentially in accordance with the arrows VII—VII in FIG. 1.

In accordance with the embodiment shown the grip member 10 has a hook-like configuration and is arranged to grip the vehicle roof edge portion 6. The hook-shaped end portion 10' of the grip member obviously could be replaced by other types of end portions, depending on the configuration of the roof edge portion. In accordance with the embodiment shown the grip member is formed at its upper end with a hook-like suspension portion 10"which is suspended from a preferably T-shaped end portion 11' of a draw bolt 11 extending on the one hand through a transverse slidable body 12 and on the other through a guide block 13. The slidable body 12 and the guide block 13, together with the bolt 11 and an adjustment nut 14 form a yoke which is threaded onto the free end of the bolt, and the yoke thus formed supports the grip member in a manner allowing vertical adjustment thereof. The support member 7 is formed with a curved cam part 15 and the lever 9 which also serves as a handle is formed with a curved cam part 16. The curved cam part 15 preferably and in accordance with the embodiment shown is formed integral with the support member 7 and is shown, for instance in FIG. 2, as a downwardly open recess which from an upper inclined portion merges downwards into a vertical portion. One side face of the recess defines a first cam curve 15" and its opposite delimitation face defines second cam curve 15'''. The curved cam part 16 formed on the lever defines a cam curve 16" which has a convex curvature and merges at its upper end into a first shoulder 16a' and at its lower end into a second shoulder 16b'. As most clearly appearing from FIG. 7, the cam curves 15" are two in number and they are arranged spaced a distance a apart whereas the cam curves 16" likewise are two in number and are arranged in parallel with the cam curves 15" and adjacent the latter. The spacing between the two cam curves 15" is bridged by the guide block 13. FIG. 7 also clearly shows the lower T-shaped end portion 11' of the draw bolt 11. The draw bolt 11 extends through a transverse boring in the slidable body 12. The adjustment nut 14 rests in a depression 17 in the guide block 13, said depression having a shape adapted to that of the nut. In this manner the nut 14 is prevented from unintentionally shifting its position on the draw bolt 11. Adjustment of the nut position can only be achieved after the draw bolt 11 first having been drawn upwards relatively to the guide block 13 sufficiently far for the nut 14 to go free of the portion of the depression 17 that has a shape agreeing with that of the nut. In the outer position of pivotal movement of the handle 9 the cam curves and the slidable body assume the mutual position illustrated in FIG. 4. In this position, the slidable body 12 rests against the lower shoulder 16b' of the cam curve 16" and thus is prevented from freely falling out of the slit 15', the shoulder thus defining end-position stop means with respect to the sliding motions of the slidable body 12. By pivoting the handle 9 upwards, i.e. by pivoting the handle clock-wise as seen in FIG. 4, its curved cam part 16 will perform a movement with respect to the curved cam part 15 that is very similar to the movement performed by the blades of a pair of scissors. During this motion the slidable body 12 will be forced, on account of its abutment against cam curve 15" as well as against cam curve 16", to move in front of the "scissor nip" of the two curved cam parts as appears from FIGS. 5 and 6. FIG. 6 illustrate the same handle position as in FIG. 1. In this position the slidable body rests on the shoulder 16a' of the cam curve 16". By adequate configuration of the two cam curves 15" and 16" the gear ratio between the pivotal movement of the handle 9 and the motion of displacement of the slidable body 12 may be determined. Preferably, this gear ratio is adjusted in such a manner as to make the displacement motion of the slidable body 12 comparatively rapid during the first part of the pivotal movement of the handle from the position in FIG. 2 whereas this motion of the slidable body 12 is comparatively slow during the latter part of the handle pivotal movement, when a comparatively high gear ratio is required to provide maximum force when the hook-shaped end portion 10' of the grip member reaches its clamping position. It should be mentioned that where the expression "curved cam part" is mentioned, another embodiment would include a cam curve that is straight.

Preferably, the width of the recess 15' is chosen to only slightly exceed the diameter of the slidable body 12, which means that the risk that the slidable body 12 unintentionally lifted off too far away from the cam curve 15", also when the handle is fully pivoted outwards, has been eliminated.

Figure 3:
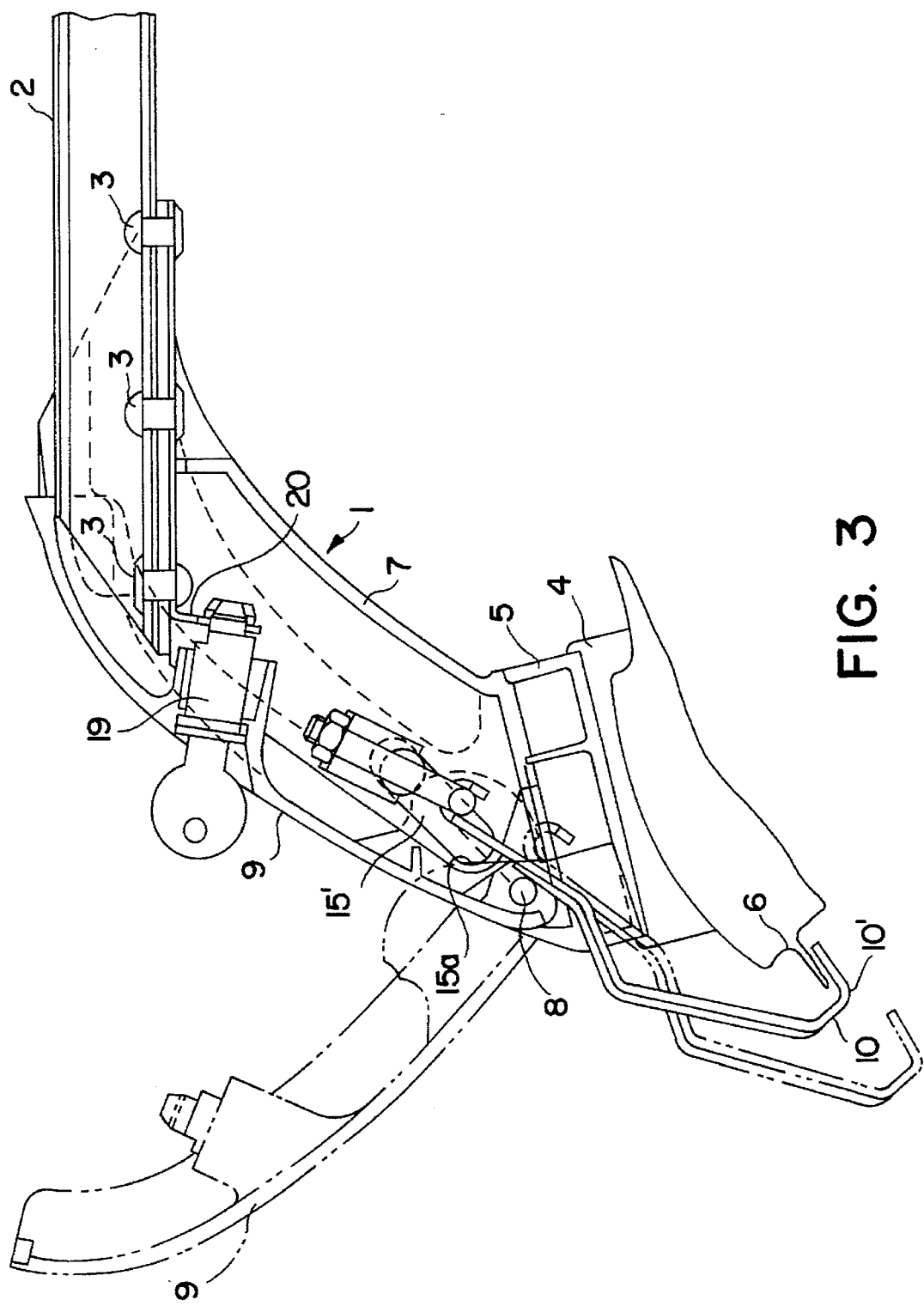
FIG. 3 illustrates a foot member in accordance with a some what modified embodiment, the moveable components being shown in the secured as well as in the released position, FIGS. 4–6 schematically illustrate sequentially the relative positions of the curved cam parts and the slidable body respectively before, during, and after securing the foot member to the vehicle roof edge portion.

In FIG. 3 components equivalent to those described with reference to the previous embodiment have received identical numeral references.

The latter emodiment is distinguished from the first one primarily in that the recess 15' is straight and not open downwards. Instead, its lower end limitation face 15a forms the lower abutment face for contact with the slidable body 12, which means that the slidable body is prevented from falling out of the recess, also when the lower shoulder 16b' of the curved cam part 16 is missing. In addition, this embodiment is distinguished from the first one in that instead of a blind plug 18 a key-receiving insert 19 is mounted for cooperation with a looking tongue 20 provided in the interior of the support member, in order to lock the handle in its operative clamping position. In this manner unauthorized removal of the load-carrier from the vehicle is prevented.

The invention is not limited to the embodiments described above and illustrated in the drawings but could be varied as to its details within the scope of the appended claims without departing from the basic conception of the invention. For instance the number and mutual positions of the cam curves could be varied within wide limits without departing from the fundamental idea of the invention. Provided that adequate control of the slidable body may be achieved it may in certain cases suffice to have one cam curve on the lever member 9 and one cam curve on the support member 7. Obviously, the cam curves could appear in a greater number than described in the foregoing.

I claim:

1. An improved roof-mounted load carrier for a vehicle, said carrier having a pair of support members placed on opposed sides of a vehicle roof of the type having drip rails, each of said members having a bottom end and a top end, said support members interconnected together at the top ends by a common carrier rail extending transversely across the vehicle roof, said support member including a pivotably attached lever and a grip member having a pair of ends, one of said ends in cooperating engagement with the roof drip rail for securement of said carrier to said vehicle roof, said grip member being vertically displaceable relative to said support member and said drip rail, the improvement comprising:

said support member including a pad at said bottom that rests on the vehicle roof, said support member formed with a pair of laterally disposed cam surfaces, and said lever being formed with a pair of laterally disposed cam surfaces, said support member cam surfaces and said lever cam surfaces in confronting relationship to each other, said support cam surfaces each positioned inward of said lever cam surfaces, wherein each of said pair of cam surfaces form a common nip therebetween upon pivotal movement of said lever relative to said support member, said cam surfaces of said support member defined by an open recess having a vertical portion merging into an upper inclined portion, a transverse slidable body positioned within said nip and being connected to said other end of said grip member, said transverse slidable body vertically displaceable within said open recess of said support member upon pivotable movement of said lever, thereby causing said lever cam surfaces to act upon said slidable body and cause vertical displacement thereof, said displacement causing said grip member to forcibly clamp against said roof drip rail upon verticle displacement thereof.

2. The carrier as claimed in claim 1, wherein the lever serves as a handle wherein each of the cam surfaces is positioned on a same side of the pivot connection as the lever, such that the nip is displaced away from the pivot connection when the lever is pivoted towards the support member.

3. The carrier as claimed in claim 1, wherein the support member cam surfaces each define a cam curve and the lever cam surfaces each define a cam curve, each of said curves is spaced laterally apart, and in a mutually parallel relationship.

4. The carrier as claimed in claim 3, wherein the spacing between the support member cam curves being bridged by a yoke member supporting the sliding body, said yoke member comprised of a T-shaped end portion attached to a vertically disposed draw bolt, and a guide block receiving said bolt therethrough, said bolt extending through said transverse slidable body, said T-shaped portion having the other said end of said grip member connected thereto.

5. The carrier as claimed in claim 4, wherein the draw bolt of the yoke member has a threaded end extending through the guide block, said end including a nut thereon, wherein movement of said nut controls the vertical position of said grip member relative to the support member, and thus tightening force between said grip member and said support member, said tightening force adjusted by one of a screwing and unscrewing of the nut or the draw bolt.

6. The carrier as claimed in claim 1, wherein said cam surfaces on said lever each include a shoulder having an edge for supporting said slidable body, said edge extending transversely relative to the vertical direction of the pulling force acting on the slidable body.

7. The carrier as claimed in claim 4, the guide block of the yoke member includes supporting faces, said faces respectively face towards a side face of each of the support member cam surfaces.

8. The carrier as claimed in claim 1, wherein a curvature of each of the cam surfaces defines a respective cam curve, each of said cam curves are configured to create a gear ratio between the lever and the grip member, said ratio being higher during a last part of the pivotal movement of the lever, than during a remainder of that movement.

* * * * *